United States Patent [19]

Bader

[11] Patent Number: 4,756,659
[45] Date of Patent: Jul. 12, 1988

[54] AUTOMATED LOAD AND UNLOAD HIGHWAY TRAILER

[76] Inventor: Samuel M. Bader, 225 Howe St., Elyria, Ohio 44035

[21] Appl. No.: 856

[22] Filed: Jan. 6, 1987

[51] Int. Cl.$^4$ .............................. B60P 1/38; B60P 1/52
[52] U.S. Cl. ..................................... 414/502; 198/611
[58] Field of Search ........................ 414/502-505, 414/528-535, 28, 400; 198/721, 725, 790, 611, 577, 575, 576; 193/35 C, 35 R

[56] References Cited

U.S. PATENT DOCUMENTS

| | | | |
|---|---|---|---|
| 2,720,322 | 10/1955 | Locke | 414/28 X |
| 2,729,324 | 1/1956 | Howdle | 198/611 |
| 2,771,203 | 11/1956 | Collins et al. | 198/611 X |
| 3,133,386 | 5/1964 | Johnston | 198/577 X |
| 3,279,423 | 10/1966 | Russell | 198/611 X |
| 3,317,066 | 5/1967 | Hamm | 414/528 |
| 3,638,779 | 2/1972 | Milazzo | 198/790 |
| 3,735,885 | 5/1973 | Comfort | 414/503 |
| 3,880,303 | 4/1975 | Coval | 414/528 |
| 3,937,338 | 2/1976 | Cox | 414/528 |
| 4,072,242 | 2/1978 | Cook | 414/528 X |
| 4,655,667 | 4/1987 | Plumb et al. | 414/535 X |

Primary Examiner—Joseph E. Valenza
Assistant Examiner—David A. Bucci
Attorney, Agent, or Firm—Richard L. Miller

[57] ABSTRACT

An automated load and unload highway trailer is provided and consists of a conveyor assembly split into two sections driven by a reversible motor to facilitate loading and unloading of a shipment of articles to and from the superstructure of the trailer.

4 Claims, 1 Drawing Sheet

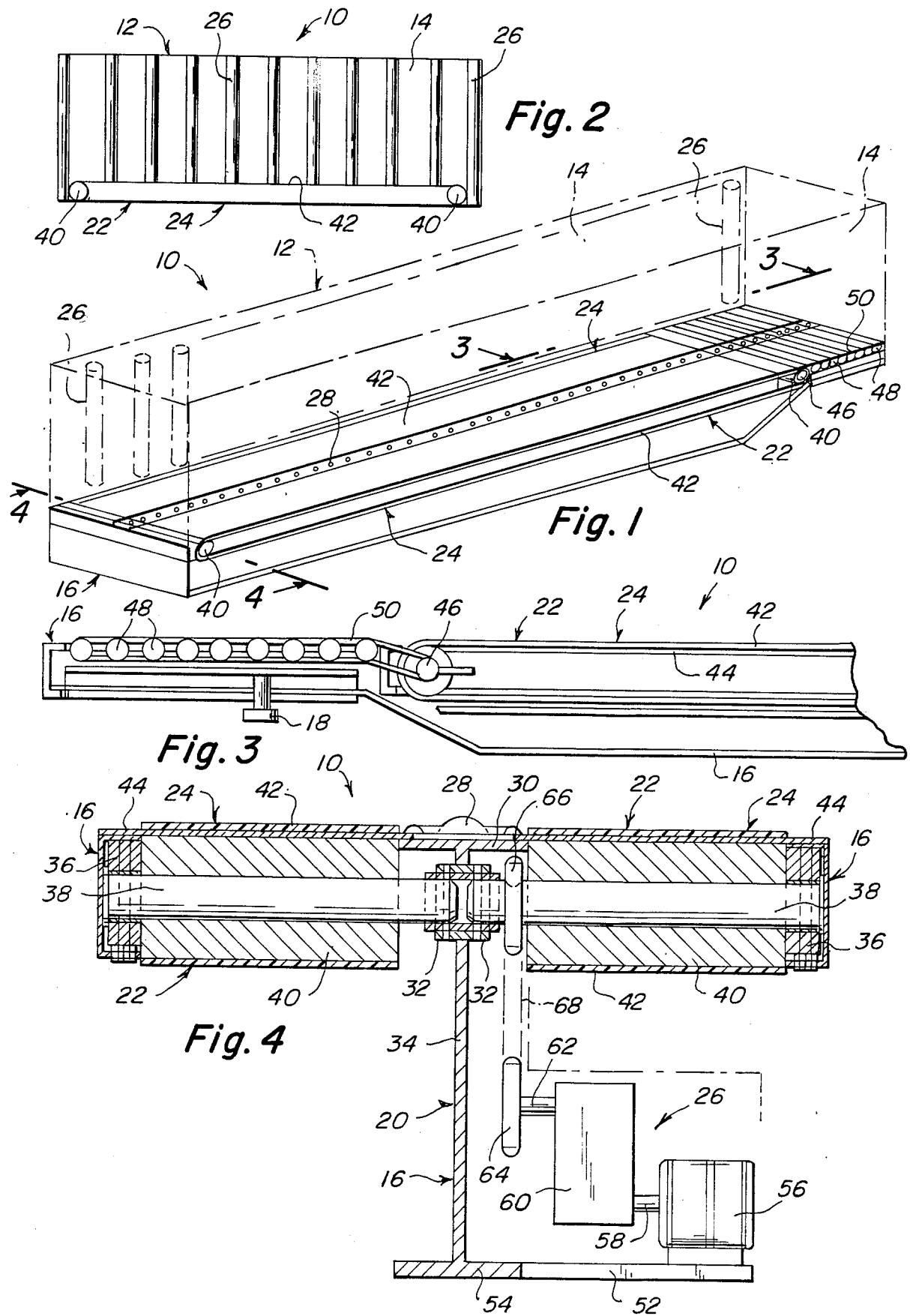

AUTOMATED LOAD AND UNLOAD HIGHWAY TRAILER

BACKGROUND OF THE INVENTION

The instant invention relates generally to truck loading devices and more specifically it relates to an automated load and unload highway trailer.

Numerous truck loading devices have been provided in the prior art that are adapted to load and unload various items to and from the trailer floors. For example, U.S. Pat. Nos. 2,567,178, 2,672,993 and 2,678,740 all are illustrative of such prior art. While these units may be suitable for the particular purpose to which they address, they would not be as suitable for the purpose of the present invention as hereafter described.

SUMMARY OF THE INVENTION

A primary object of the present invention is to provide an automated load and unload highway trailer that will overcome the shortcomings of the prior art devices.

Another object is to provide an automated load and unload highway trailer in which a single operator can load and unload a shipment of articles in a short time undamaged and with a minimum of labor.

An additional object is to provide an automated load and unload highway trailer that includes a conveyor assembly split into two sections driven by a reversible motor to facilitate loading and unloading of the superstructure of the trailer.

A further object is to provide an automated load and unload highway trailer that is simple and easy to use.

A still further object is to provide an automated load and unload highway trailer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention with parts shown in phantom.

FIG. 2 is a diagrammatic cross sectional view showing pipe rollers in a side wall of the invention.

FIG. 3 is an enlarged side view of the conveyer as seen along line 3—3 in FIG. 1.

FIG. 4 is a still further enlarged cross sectional view as indicated by line 4—4 in FIG. 1 showing the motor and drive train mechanism.

DETAILED DESCRIPTION OF THE PREFERRED EMBODIMENTS

Turning now descriptively to the drawings, in which like reference characters denote like elements throughout the several views, FIG. 1 through 4 illustrates an automated load and unload highway trailer 10 that contains a superstructure 12 that has a pair of sidewalls 14. A base frame 16 is provided that has a king pin 18 and an I-beam member 20 positioned longitudinally down middle thereof. The base frame 16 is affixed to underside of the superstructure 12. A conveyor or assembly 22 is split into two sections 24 and rotatively mounted within the base frame 16 on both sides of the I-beam member 20. An apparatus 26 is also provided for driving simultaneously the two sections 24 of the conveyor assembly 22 forwardly in one instance send rearwardly in another instance so as to load and unload a shipment of articles (not show).

The highway trailer 10 further contains a plurality of pipe rollers 26 which are spaced apart and mounted vertically to the sidewalls 14 in the superstructure 12 so as to prevent any of the articles from hanging up on the sidewalls.

A plurality of ball transfer members 28 are spaced apart and mounted to top flange 30 of the I-beam member 20 to make a continuous transfer of the articles so as to prevent any of the articles from hanging up on the top flange of the I-beam member.

Each of the sections 24 of the conveyor assembly 22 includes a pair of support bearings 32, spaced apart and mounted through upper portion of web 34 of the I-beam member 20. A pair of end bearings 36 are spaced apart and mounted to the base frame 16. A pair of axles 38 are provided, in which each is mounted between one of the support bearings 32 and one of the end bearings 36. A pair of pulleys 40 are also provided in which each is mounted on to one the axles 38. An elongated endless belt 42 extends around the pulleys 40. An elongated plate 44 is mounted to and extends from the top flange 30 of the I-beam member 20 to the base frame 16 to support the endless belt 42.

A V-pulley 46 is mounted to end of one of the axles 38 near and above the king pin 18 of the base frame 16. A plurality of power rollers 48 are spaced apart and rotatively mounted between the upon portion of the web 34 of the I-beam member 20 and the base frame 16. An endless V-belt 50 extends around the V-pulley 46 and ends of the power rollers 48 so as to rotate the power rollers.

The apparatus 26 consists of a support bracket 52 which is mounted to and extends from bottom flange 54 of the I-beam member 20. A reversible motor 56 which has a drive shaft 58 is mounted to the support bracket 52. A variable speed transmission drive 60 which has a driven shaft 62 is connected to the drive shaft 58 of the motor 56. A first sprocket 64 is mounted to the driven shaft 62 of the variable speed transmission drive 60 while second sprocket 66 is mounted to one of the axles 38. An endless chain 68 extends around the first sprocket 64 and the second sprocket 66 so that the motor 56 via the transmission drive 60 can operate the conveyor assembly 22.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automated load and unload highway trailer comprising:
   (a) a superstructure having a pair of side walls;
   (b) a base frame having a kingpin and an I-beam member positioned longitudinally down a middle thereof, said base frame affixed to an underside of said superstructure;

(c) a conveyor assembly split into two sections and rotatively mounted within said base frame on both sides of said I-beam member;

(d) means for driving simultaneously said two sections of said conveyor assembly forwardly in one instance, and rearwardly in another instance so as to load and unload a shipment of articles, each conveyor section being split into a forward part of the base frame and a colinear rearward part of the base frame, the rearward part including:

(e) a pair of support bearings spaced apart and mounted through an upper portion of a web of said I-beam member;

(f) a pair of end bearings, spaced apart and mounted to said base frame;

(g) a pair of axles, each of which is mounted between one of said support bearings and one of said end bearings;

(h) a pair of pulleys, each of which is mounted onto one of said axles;

(i) elongated endless belts extending around said pulleys;

(j) an elongated plate mounted to and extending from the top flange of said I-beam member to said base frame to support said endless belt, the forward part of the base frame including;

(k) a V-pulley mounted to an end of one of said axles, near and above the kingpin of said base frame;

(l) a plurality of power rollers spread apart and rotatively mounted between the upper portion of the web of said I-beam member and said base frame; and (m) an endless V-belt extending around said V-pulley and ends of said power rollers so as to rotate said power rollers, whereby the conveyor assembly uses an endless belt for the rearward part and power rollers for the forward part.

2. An automated load and unload highway trailer as recited in claim 1, further comprising a plurality of pipe rollers, which are spaced apart and mounted vertically to said sidewalls in said superstructure so as to prevent any of the articles from hanging up on said sidewalls.

3. An automated load and unload highway trailer as recited in claim 2, further comprising a plurality of ball transfer members which are spaced apart and mounted to a top flange of said I-beam member to make a continuous transfer of the articles so as to prevent any of the articles from hanging up on the top flange of said I-beam member.

4. An automated load and unload highway trailer as recited in claim 3, wherein said driving means comprises;

(a) a support bracket mounted to and extending from a bottom flange of said I-beam member;

(b) a reversible motor having a driving shaft, said motor mounted to said support bracket;

(c) a variable speed transmission drive having a driven shaft said transmission drive connected to the drive shaft of said motor;

(d) a first sprocket mounted to the driven shaft of said variable speed transmission drive;

(e) a second sprocket mounted to one of said axles; and (f) an endless chain extending around said first sprocket and said second sprocket so that said motor via said transmission drive can operate said conveyor assembly.

* * * * *